United States Patent [19]

Ishioka

[11] Patent Number: 5,191,028
[45] Date of Patent: Mar. 2, 1993

[54] RUBBER COMPOSITION COMPRISING DIENE RUBBER MATERIAL AND VULCANIZATION ACCELERATORS

[75] Inventor: Yutaka Ishioka, Nagoya, Japan

[73] Assignee: Tokai Rubber Industries, Ltd., Aichi, Japan

[21] Appl. No.: 752,897

[22] Filed: Aug. 26, 1991

Related U.S. Application Data

[63] Continuation of Ser. No. 459,656, Jan. 2, 1990, abandoned.

[30] Foreign Application Priority Data

Jan. 12, 1989 [JP] Japan ..................................... 1-5790

[51] Int. Cl.⁵ .......................................... C08C 19/20
[52] U.S. Cl. ................................. 525/332.7; 525/236; 525/352
[58] Field of Search ............ 525/346, 349, 352, 332.6, 525/332.7

[56] References Cited

U.S. PATENT DOCUMENTS

2,429,080 10/1947 Sterrett ................................. 525/352
3,354,131 11/1967 Trivette, Jr. ......................... 525/346

*Primary Examiner*—Christopher Henderson
*Attorney, Agent, or Firm*—Oliff & Berridge

[57] ABSTRACT

A rubber composition containing 100 parts by weight of a diene rubber material, 0.5 to 2.0 parts by weight of N-cyclohexyl-2-benzothiazyl sulfenamide, and 0.02 to 1.0 part by weight of a condensation product of n-butylaldehyde and aniline. Further disclosed is another rubber composition containing 100 parts by weight of a diene rubber material, 1.5 to 2.5 parts by weight of N-cyclohexyl-2-benzothiazyl sulfenamide, 0.02 to 1.0 part by weight of a condensation product of n-butylaldehyde and aniline, and 0.3 to 1.5 part by weight of tetrabutylthiuram disulfide.

6 Claims, No Drawings

RUBBER COMPOSITION COMPRISING DIENE RUBBER MATERIAL AND VULCANIZATION ACCELERATORS

This is a continuation of application Ser. No. 07/549,656 filed Jan. 2, 1990, now abandoned.

BACKGROUND OF THE INVENTION

1. Field of the Invention

The present invention relates in general to a rubber composition, and in particular to such a rubber composition comprising a diene rubber material and vulcanization accelerators.

2. Discussion of the Prior Art

Molding and vulcanization of a rubber material or composition need thermal energy, unlike forming of a plastic or resin material. The cycle time of molding and vulcanization of a rubber material can be shortened to generally the same as that of forming of a resin material, by reducing the vulcanizing time of the rubber material.

The so-called "high-temperature and short-time" vulcanization method is one of the known vulcanization methods in which the vulcanizing time is reduced. In this method, vulcanization is performed at higher temperature so as to enhance reaction between a vulcanizing agent and a rubber material. However, since the rubber material is subjected to high temperature, reversion tends to take place. If reversion takes place, rubber articles produced from the rubber material suffer from deteriorated properties, specifically modulus. In particular, in the case of a rubber material for a rubber vibration isolator, in which the rubber material is adhered by vulcanization to a metal member to which a vulcanizable adhesive has been applied, the rubber vibration isolator produced suffers from lowered adhesive force between the vulcanized rubber and the metal member. Thus, the rubber vibration isolator as an end product is not satisfactory in qualities, specifically in these two respects; one is the properties of the vulcanized rubber and the other is the adhesive force between the vulcanized rubber and the metal member.

Meanwhile, various vulcanization accelerators have conventionally been used for the purpose of reducing vulcanizing time or increasing vulcanization rate without having to raise vulcanizing temperature. The known vulcanization accelerators are such as; sulfenamide type accelerators, thiazole type accelerators, thiuram type accelerators, dithiocarbamates, and xanthates. Above all, the thiuram type accelerators are very excellent vulcanization accelerators. Vulcanizing time can be reduced to a significantly short time by using a thiuram type accelerator solely or in combination with a sulfenamide type accelerator.

However, the use of a thiuram type accelerator leads to deteriorating the properties of the vulcanized rubber, in particular extremely deteriorating tear strength and elongation thereof. If a thiuram type accelerator is used for vulcanizing a rubber material to produce a rubber vibration isolator, the rubber vibration isolator as an end product suffers from reduced durability.

Thus, it has conventionally been difficult to reduce the vulcanizing time without deteriorating the qualities of the rubber articles or products.

The requirement that the vulcanizing time be reduced is remarkably high in the field of manufacture of rubber products having a large rubber volume, specifically rubber vibration isolators for engine mounts. In the field of the engine mounts, another method has been employed for reducing the vulcanizing time, wherein a rubber material is raised to high temperature before the rubber material is poured into the cavity of a metal mold. In this method, however, the vulcanized rubber suffers from lowered modulus due to burning and/or the shear forces applied thereto during processing or working thereof, because before being poured the rubber material is subjected to high temperature. The lowered modulus of the vulcanized rubber will lead to lowering the durability of an engine mount as an end product.

SUMMARY OF THE INVENTION

It is therefore an object of the present invention to provide a rubber composition which is vulcanized in a comparatively short time without having to raise vulcanizing temperature or without leading to deteriorating the qualities of rubber products, such as strength, adhesive force or spring constant.

The Inventor has made extensive studies and researches, and found that, in the case of a rubber composition containing a diene rubber material, particularly natural rubber, it is preferred to add to the composition a sulfenamide type vulcanization accelerator, because this accelerator effectively enhances the vulcanization reaction without deteriorating the qualities of rubber products such as strength, adhesive force or durability thereof. Thus, a sulfenamide type accelerator is used as a primary vulcanization accelerator in a rubber composition in accordance with the present invention. In addition, the Inventor has found that it is more advantageous to use, in combination with the primary accelerator, a secondary accelerator which earlier begins to operate for enhancing the vulcanization reaction than the primary accelerator and thereby serves as an initiator for causing the primary accelerator to operate for enhancing the vulcanization reaction. When a condensation product of n-butylaldehyde and aniline is used as a secondary accelerator, the vulcanization reaction is completed in a reduced time without resulting in lowering the properties of the vulcanized rubber or the qualities of the rubber product. This condensation product provides another advantage that the vulcanization rate or vulcanizing time is changeable or controllable by adjusting the amount of addition of the condensation product to the rubber composition. The present invention has been developed based on these findings.

According to a first aspect of the present invention there is provided a rubber composition comprising 100 parts by weight of a diene rubber material, 0.5 to 2.0 parts by weight of N-cyclohexyl-2-benzothiazyl sulfenamide, and 0.02 to 1.0 part by weight of a condensation product of n-butylaldehyde and aniline.

According to a second aspect of the present invention there is provided a rubber composition comprising 100 parts by weight of a diene rubber material, 1.5 to 2.5 parts by weight of N-cyclohexyl-2-benzothiazyl sulfenamide, 0.02 to 1.0 part by weight of a condensation product of n-butylaldehyde and aniline, and 0.3 to 1.5 part by weight of tetrabutylthiuram disulfide.

In the rubber composition in accordance with the first aspect of the present invention, the N-cyclohexyl-2-benzothiazyl sulfenamide (hereinafter, referred to as "CZ") is used as the primary vulcanization accelerator, while the condensation product of n-butylaldehyde and aniline (hereinafter, referred to as "B-A") is used as the secondary vulcanization accelerator. In other words, the two kinds of vulcanization accelerators are used in combination for enhancing the vulcanization of this rubber composition.

Meanwhile, in the rubber composition in accordance with the second aspect of the present invention, the tetrabutylthiuram disulfide (hereinafter, referred to as "TBT") is used, as another secondary vulcanization accelerator, in combination with the above-indicated two accelerators. In other words, the three kinds of vulcanization accelerators are used in combination for enhancing the vulcanization of this rubber composition.

The use of the primary accelerator CZ for the vulcanization of a rubber composition containing a diene rubber material, does not adversely affect the properties of the vulcanized diene rubber, or the adhesive force or durability of the diene rubber product, thereby assuring high qualities of the diene rubber product.

Further, the secondary accelerator B-A, when used in combination with the primary accelerator CZ, enhances the vulcanization reaction without leading to lowering the strength of the vulcanized rubber, or the adhesive force or durability of the rubber product. Since the secondary accelerator B-A earlier begins to operate than the primary accelerator CZ, the accelerator B-A serves as an initiator for causing the accelerator CZ to operate for enhancing the vulcanization reaction, and thereby contributes to increasing the vulcanization rate, namely, vulcanizing time. Although the contribution of the primary accelerator CZ to reducing the vulcanizing time is comparatively low, the vulcanizing time is largely reduced as a whole owing to the use of the secondary accelerator B-A in combination with the primary accelerator CZ.

Moreover, in the case of the rubber composition in which the secondary accelerator TBT (tetrabutylthiuram disulfide) is used in combination with the primary accelerator CZ and the secondary accelerator B-A, the diene rubber article produced therefrom has improved heat resistance and accordingly has improved durability. While the use of a thiuram type vulcanization accelerator has conventionally had the problem of lowering the properties of vulcanized rubber, the use of the accelerator TBT in this rubber composition does not lead to lowering the properties of vulcanized rubber, because the accelerator TBT is used, as a secondary or subsidiary accelerator, in its relatively small content with respect to that of the diene rubber material.

As emerges from the foregoing, in a rubber composition in accordance with the present invention, the primary vulcanization accelerator CZ is used in combination with the secondary accelerator B-A, or the secondary accelerators B-A and TBT, whereby the vulcanizing time of the rubber composition is significantly reduced without needing to raise the vulcanizing temperature or without resulting in lowering the properties of the vulcanized rubber.

In addition, the secondary accelerator B-A provides the advantage that as the content thereof contained in a rubber composition is increased the vulcanization rate is correspondingly increased, that is, the vulcanizing time is reduced in proportion to the increased content of the accelerator B-A. Accordingly, the vulcanization rate of the rubber composition is changeable by adjusting the content of the accelerator B-A contained in the rubber composition.

Moreover, a rubber composition in accordance with the present invention is vulcanized in a reduced time without having to raise the vulcanizing temperature or conducting any additional steps other than the conventionally employed steps. Thus, the cycle time of production of a rubber product from the rubber composition is reduced as compared with those of the conventional rubber compositions, without leading to sacrificing the operational safety.

DETAILED DESCRIPTION OF THE INVENTION

The diene rubber material used in a rubber composition in accordance with the present invention may be any of known diene rubber materials; such as natural rubber (NR), butadiene rubber (BR), or styrene-butadiene rubber (SBR), or any blend of these materials.

A rubber composition in accordance with the present invention is prepared by adding, to the diene rubber material, the previously described two or three vulcanization accelerators. However, the rubber composition may further contain at least one additive selected from the group including a vulcanizing agent, a vulcanization activator, a processing aid, an antioxidant, a reinforcing agent, and a softener. The rubber composition may also contain a filler or a tackifier, as needed.

According to the principle of the present invention, the vulcanization accelerators CZ and B-A, or the vulcanization accelerators CZ, B-A and TBT are used, as the primary and secondary vulcanization accelerators, in their respective contents relative to the content of the diene rubber material.

In the rubber composition in which the accelerators CZ and B-A are used in combination as the primary and secondary accelerators, the primary accelerator CZ is used in its content of 0.5 to 2.0 parts by weight per 100 parts by weight of the diene rubber material, while the secondary accelerator B-A is used in its content of 0.02 to 1.0 part by weight per 100 parts by weight of the diene rubber material. If the content of the accelerator CZ is less than the lower limit of 0.5 part by weight, the accelerator CZ does not sufficiently operate for enhancing the vulcanization reaction. On the other hand, if the content of the accelerator CZ exceeds the upper limit of 2.0 parts by weight, the properties of vulcanized rubber, specifically mechanical strengths are lowered to unsatisfactory degrees. In addition, if the content of the accelerator B-A is less than the lower limit of 0.02 part by weight, the function of the accelerator B-A as the initiator for the accelerator CZ is not observed. On the other hand, if the content of the accelerator B-A exceeds the upper limit of 1.0 part by weight, burning takes place. The content of the secondary accelerator B-A may be changeable according to desired vulcanization parameters including vulcanizing time, and/or the characteristics of selected diene rubber materials. Since the stability of the secondary accelerator B-A is maintained for at least two weeks after the addition thereof to the rubber composition. the vulcanization of the rubber composition is conducted with improved efficiency.

Meanwhile, in the rubber composition in which the vulcanization accelerators CZ, B-A and TBT are used in combination as the primary and secondary accelerators, the primary accelerator CZ is used in its content of 1.5 to 2.5 parts by weight per 100 parts by weight of the diene rubber material, one of the secondary accelerators B-A is used in its content of 0.02 to 1.0 part by weight per 100 parts by weight of the diene rubber material, and the other secondary accelerator TBT is used in its content of 0.3 to 1.5 part by weight of the diene rubber material. If the content of the accelerator TBT is less than the lower limit of 0.3 part by weight, the vulcanized rubber suffers from lowered heat resistance. On the other hand, if the content of the accelerator TBT exceeds the upper limit of 1.5 part by weight, the vulcanized rubber suffers from deteriorated properties, specifically mechanical strengths. The content of the accelerator B-A relative to that of the diene rubber material, in this rubber composition, is equal to that in the above-described, preceding rubber composition. On the other hand, the content of the accelerator CZ relative to that of the diene rubber material, in this rubber composition, is different from that in the preceding rubber composition. If in this rubber composition the content of the accelerator CZ is less than the lower limit of 1.5 part by weight, the accelerator CZ does not sufficiently operate for enhancing the vulcanization reaction. In addition, if the content of the accelerator CZ exceeds the upper limit of 2.5 parts by weight, the vulcanized rubber suffers from deteriorated properties.

Each of the additives other than the vulcanization accelerators may be added to a rubber composition in a conventional manner. For example, sulfur serving as a vulcanizing agent normally is added in its content of 0.1 to 10 parts by weight per 100 parts by weight of the diene rubber material. A metallic oxide such as zinc oxide, serving as a vulcanization activator, generally is added in its content of 3 to 15 parts by weight per 100 parts by weight of the diene rubber material. A fatty acid such as stearic acid, serving as a processing aid, may be used in its content of 0.5 to 5 parts by weight per 100 parts by weight of the diene rubber material. An antioxidant normally is used in its content of 0.5 to 8 parts by weight per 100 parts by weight of the diene rubber material. The antioxidant may be selected from the group including amine type antioxidants, phenol type antioxidants, imidazole type antioxidants, metal salts of carbamic acids, and waxes.

In addition, a reinforcing agent may be added to a rubber composition for improving the properties, in particular mechanical characteristics of the vulcanized rubber; such as tensile strength, hardness, tear strength, and wear resistance. The reinforcing agent may be carbon black or silica. The rubber composition may contain 10 to 100 parts by weight of the reinforcing agent per 100 parts by weight of the diene rubber material. Further, a softener may optionally be added in its content of 0 to 4 parts by weight per 100 parts by weight of the diene rubber material. The softener may be a paraffinic, naphthenic or aromatic process oil, or an ester plasticizer.

A filler may be added, as needed, to a rubber composition in its content of 0 to 150 parts by weight per 100 parts by weight of the diene rubber material. The filler may be calcium carbonate, clay or talc. A tackifier may be added, as needed, in its content of 0 to 10 parts by weight per 100 parts by weight of the diene rubber material. The tackifier may be selected from the group including alkylformaldehyde resins, coumarone-indene resin, xyleneformaldehyde resins, petroleum resins, and hydrogenated rosins.

A rubber composition in accordance with the present invention is prepared by mixing a diene rubber material with the two or three predetermined vulcanization accelerators, and additionally various additives, in a known suitable manner.

Also, a rubber composition in accordance with the present invention is processed into a rubber product in known process steps including kneading, molding and vulcanization.

To further clarify the concept of the present invention, the invention will be illustrated by way of examples thereof. It is however to be understood that the present invention is by no means limited to the details of the examples.

EXAMPLES

Example A-1

The characteristics of the vulcanization accelerator CZ (N-cyclohexyl-2-benzothiazyl sulfenamide) are examined.

The following is the basic rubber composition A employed in the examination:

| RUBBER COMPOSITION A | |
|---|---|
| <Constituents> | <Contents (parts by weight)> |
| Natural rubber (NR) | 100 |
| Zinc oxide | 5 |
| Stearic acid | 1 |
| Antioxidant | 2 |
| Wax | 2 |
| FEF Carbon | 40 |
| Naphthenic process oil | 15 |
| Sulfur | 2 |

A rubber composition is prepared by adding, to the basic rubber composition A, one part by weight of each of three sorts of sulfenamide type vulcanization accelerators; N-cyclohexyl-2-benzothiazyl sulfenamide (CZ), N-oxydiethylene-2-benzothiazyl sulfenamide (MSA), and N-tert-butyl-2-benzothiazyl sulfenamide (NS). In each rubber composition, the vulcanization accelerator serves for enhancing the vulcanization of the natural rubber (NR). A vulcanization time of each rubber composition (i.e., time needed for the vulcanization thereof) is measured, and the original properties of the vulcanized rubber are determined. TABLE I shows the results.

It is noted that the original properties of a vulcanized rubber are determined according to the test protocol K-6301 of JIS (Japanese Industrial Standard). Meanwhile, a vulcanization time of a rubber composition is measured at 90% torque (T90) of a maximum torque according to the 160° C. vulcanization curve of Monsant Rheometer. In the latter test, a time at 10% torque (T10) of the maximum torque is also measured, which time indicates processability of the vulcanized rubber.

As clearly understood from the results on TABLE I, the vulcanization accelerator CZ, which is used as the primary accelerator in a rubber composition in accordance with the present invention, is the most excellent of all the sulfenamide type accelerators. More specifically, the vulcanization accelerator CZ is a well-balanced accelerator capable of effectively reducing the vulcanizing time of the rubber composition containing natural rubber (NR), while assuring satisfactory properties, adhesive force and durability of the vulcanized rubber.

TABLE I

| VULCANIZATION ACCELERATORS | | CZ | MSA | NS |
|---|---|---|---|---|
| VULCANIZING | T10 | 4'57" | 5'30" | 5'03" |
| TIME (minutes & seconds) | T90 | 6'57" | 8'33" | 7'18" |
| 100% MODULUS (kg/cm$^2$) | | 16 | 16 | 15 |
| TENSILE STRENGTH (kg/cm$^2$) | | 245 | 239 | 233 |

TABLE I-continued

| | | | |
|---|---|---|---|
| ELONGATION (%) | 610 | 620 | 600 |
| HARDNESS | 50 | 50 | 50 |
| TEAR STRENGTH (TYPE B) (kgf/cm) | 59 | 54 | 53 |
| ADHESIVE FORCE (kg/cm$^2$) | 121 | 113 | 101 |
| Durability* | >10** | >10** | 8.5 |

*A dumbbell specimen formed of each rubber composition is expanded from 0% to 120% each time, and the times at which the dumbbell specimen is broken is measured as the durability thereof. (unit: ten thousand)
**The dumbbell specimen is not broken after a hundred thousand of times of 0~120% expansions.

Example A-2

The characteristics of the vulcanization accelerator B-A (condensation product of n-butylaldehyde and aniline) are examined.

A rubber composition is prepared by adding, to the basic rubber composition A used in Example A-1, 1 part by weight of the vulcanization accelerator CZ serving as the primary vulcanization accelerator, and 0.3 part by weight of each of six vulcanization accelerators serving as a secondary vulcanization accelerator; the six accelerators are a condensation product of n-butylaldehyde and aniline (B-A), 2-mercaptobenzothiazole (M), tetramethylthiuram disulfide (TT), tetrabutylthiuram disulfide (TBT), 1,3-diphenyl guanidine (D), and 1,3-diorthotolyl guanidine (DT). A vulcanization time of each rubber composition, and the original properties of the vulcanized rubber are determined by the same tests as used in Example A-1. TABLE II shows the test results.

As is apparent from the test results on TABLE II, the accelerator B-A and the accelerator M each are a well-balanced accelerator capable of reducing the vulcanizing time of the rubber composition, while assuring satisfactory properties of the vulcanized rubber. On the other hand, although showing the shortest vulcanizing time, the use of the accelerator TT as the secondary accelerator results in lowering the mechanical strengths of the vulcanized rubber, particularly the tear strength (Tr) thereof, and raising the modulus of the same, so that the elasticity of the vulcanized rubber is lowered and accordingly the qualities of rubber products are deteriorated.

TABLE II

| SECONDARY VULCANIZATION ACCELERATORS | | B-A | M | TT | TBT | D | DT |
|---|---|---|---|---|---|---|---|
| VULCANIZ- | T10 | 3'30" | 3'15" | 2'57" | 4'18" | 4'09" | 4'18" |
| ING TIME (minutes & seconds) | T90 | 4'24" | 4'57" | 3'30" | 5'06" | 5'51" | 6'03" |
| 100% MODULUS (kg/cm$^2$) | | 16 | 16 | 19 | 18 | 17 | 17 |
| TENSILE STRENGTH (kg/cm$^2$) | | 241 | 232 | 211 | 229 | 234 | 236 |
| ELONGATION (%) | | 610 | 610 | 520 | 580 | 600 | 590 |
| HARDNESS | | 50 | 51 | 53 | 52 | 52 | 52 |
| TEAR STRENGTH (TYPE B) (kgf/cm) | | 53 | 53 | 42 | 51 | 54 | 53 |
| ADHESIVE FORCE (kg/cm$^2$) | | 118 | 106 | 92 | 110 | 115 | 117 |
| Durability | | >10 | >10 | 5.3 | >10 | >10 | >10 |

Invention Example B-1

A rubber composition is prepared by adding, to the basic rubber composition A used in Example A-1, 1 part by weight of the primary vulcanization accelerator CZ and 0.1, 0.3 or 0.5 part by weight of the secondary accelerator B-A or M. In each of the thus obtained six rubber composition, two kinds of accelerators are used in combination. A vulcanization time of each of the six rubber compositions, and the original properties of the vulcanized rubber are determined by the same tests as used in Example A-1. TABLE III shows the test results.

TABLE III

| SECONDARY ACCELERATORS | | B-A | | | M | | |
|---|---|---|---|---|---|---|---|
| CONTENTS (parts by weight) | | 0.1 | 0.3 | 0.5 | 0.1 | 0.3 | 0.5 |
| VULCANZ- | T10 | 4'18" | 3'03" | 2'12" | 3'27" | 3'15" | 3'06" |
| ING TIME (minutes & seconds) | T90 | 5'51" | 4'24" | 3'24" | 5'21" | 4'57" | 4'45" |
| 100% MODULUS (kg/cm$^2$) | | 16 | 16 | 17 | 16 | 16 | 17 |
| TENSILE STRENGTH (kg/cm$^2$) | | 240 | 241 | 228 | 240 | 232 | 219 |
| ELONGATION (%) | | 600 | 610 | 590 | 610 | 610 | 580 |
| HARDNESS | | 50 | 50 | 51 | 50 | 51 | 50 |
| TEAR STRENGTH (TYPE B) (kgf/cm) | | 54 | 53 | 51 | 55 | 53 | 51 |
| ADHESIVE FORCE (kg/cm$^2$) | | 115 | 118 | 109 | 115 | 106 | 110 |
| Durability | | >10 | >10 | >10 | >10 | >10 | >10 |

As emerges from the test results indicated in TABLE III, each of the vulcanization accelerators B-A and M used in the respective contents of 0.1, 0.3 and 0.5 part by weight, contributes to producing the corresponding vulcanized rubber having satisfactory original properties. However, it is observed that the vulcanizing time (or rate) is variable depending upon the contents of the accelerator B-A, while the vulcanizing time is not variable depending upon the contents of the accelerator M. More specifically, the vulcanization rate, or vulcanization reaction-enhancing effect is increased in proportion to the contents of the accelerator B-A present in a rubber composition. This accelerator B-A is used as the secondary vulcanization accelerator in a rubber composition in accordance with the present invention.

Invention Example B-2

First, two additional basic rubber compositions are prepared by replacing, in the basic rubber composition A used in Example A-1, the natural rubber (NR) with a blend of natural rubber and butadiene rubber (NR/BR) or a blend of natural rubber and styrene-butadiene rubber (NR/SBR). All of these rubber materials NR, BR, SBR are diene rubber materials. Next, a rubber composition is prepared by adding, to each of the thus obtained three basic rubber compositions, 1 part by weight of the primary vulcanization accelerator CZ, or the combination of 1 part by weight of the primary accelerator CZ and 0.3 part by weight of the secondary accelerator B-A. A vulcanizing time of each of the thus prepared six rubber compositions, and the original properties of the vulcanized rubber are determined by the same tests as used in Example A-1. TABLE IV shows the test results.

sponding one of the vulcanized rubbers produced from the three rubber compositions in which the accelerator B-A is not used. In other words, the secondary accelerator B-A cooperates with the primary accelerator CZ to serve for enhancing the vulcanization reaction of each rubber composition, without adversely lowering the properties of the corresponding vulcanized rubber. Thus, the secondary accelerator B-A is advantageously used in each of the three sorts of rubber compositions containing the respective diene rubber materials NR, NR/BR, NR/SBR.

Invention Example B-3

A rubber composition is prepared by adding, to the basic rubber composition used in Example A-1, 1 part by weight of the primary accelerator CZ and 0, 0.01, 0.02, 0.05, 0.1, 0.3, 0.5, 1.0 or 1.5 part by weight of the secondary accelerator B-A. An injection vulcanization test is conducted on each of the prepared nine rubber compositions using a rubber injection molding machine. The temperature of an injection cylinder of the machine is 100° C., while the temperature of a mold is 163° C. The test results are shown in TABLE V. In the table, symbol O indicates that voids are observed in the interior of the produced rubber article, while symbol X indicates that voids disappear and are not observed in the interior of the produced rubber article. A time of transition from symbol O to symbol X in the table corre-

TABLE IV

| DIENE RUBBER MATERIALS (parts by weight) | NR (100) | | NR/BR (80/20) | | NR/SBR (70/30) | |
| --- | --- | --- | --- | --- | --- | --- |
| CONTENTS OF SECONDARY ACCELERATOR B-A (parts by weight) | 0 | 0.3 | 0 | 0.3 | 0 | 0.3 |
| VULCANIZ- T10 | 4'57" | 3'03" | 5'12" | 3'12" | 5'30" | 3'27" |
| ING TIME T90 (min. & sec.) | 6'57" | 4'24" | 7'15" | 4'36" | 7"27" | 4'54" |
| 100% MODULUS (kg/cm$^2$) | 16 | 16 | 17 | 18 | 18 | 18 |
| TENSILE STRENGTH (kg/cm$^2$) | 245 | 241 | 191 | 187 | 235 | 238 |
| ELONGATION (%) | 610 | 610 | 550 | 540 | 650 | 630 |
| HARDNESS | 50 | 50 | 51 | 51 | 52 | 52 |
| TEAR STRENGTH (TYPE B) (kgf/cm) | 59 | 53 | 43 | 44 | 48 | 47 |
| ADHESIVE FORCE (kg/cm$^2$) | 121 | 118 | 95 | 92 | 116 | 112 |
| Durability | >10 | >10 | >10 | >10 | >10 | >10 |

As is understood from the test results on TABLE IV, concerning each of the three sorts of rubber compositions containing the respective diene rubber materials NR, NR/BR, NR/SBR, the use of the secondary accelerator B-A in combination with the primary accelerator CZ effectively reduces the vulcanizing time (indicated by the T90 value). In addition, the original properties of each of the vulcanized rubbers produced from the three rubber compositions in which the secondary accelerator B-A is used, are comparable with those of a corresponds to a vulcanizing time of a rubber composition.

As is clearly understood from the test results on TABLE V, the secondary accelerator B-A exhibits its excellent, vulcanization reaction-enhancing effect when the accelerator B-A is used in the content of 0.02 to 1.0 part by weight per 100 parts by weight of the diene rubber material. In addition, this effect is improved in proportion to the increased content of the accelerator B-A. However, when the accelerator B-A is used in the content of 1.5 part by weight, burning takes place.

TABLE V

| CONTENTS OF SECONDARY ACCELERATOR B-A (parts by weight) VULCANIZING TIME | 0 | 0.01 | 0.02 | 0.05 | 0.1 | 0.3 | 0.5 | 1.0 | 1.5 |
| --- | --- | --- | --- | --- | --- | --- | --- | --- | --- |
| 4 min. | | | | | | | | | BURNING |
| 5 min. | | | | | | | | O | |
| 6 min. | | | | | | | | O | X |
| 7 min. | | | | | | O | O | O | X |

TABLE V-continued

| | | | | | | | | |
|---|---|---|---|---|---|---|---|---|
| 8 min. | | | | | O | O | X | X |
| 9 min. | | | | | | O | X | X | X |
| 10 min. | O | O | O | O | X | X | | |
| 11 min. | O | O | X | X | X | | | |
| 12 min. | X | X | X | X | X | | | |

Example A-3

The following rubber composition B is a known, non-bloom type vulcanizing system, which is suitable for the semi-effective vulcanization:

| NON-BLOOM RUBBER COMPOSITION B | |
|---|---|
| <Constituents> | <Contents (parts by weight)> |
| Natural rubber (NR) | 100 |
| Zinc oxide | 5 |
| Stearic acid | 1 |
| Antioxidant | 2 |
| Wax | 2 |
| FEF Carbon | 40 |
| Naphthenic process oil | 15 |
| Sulfur | 0.7 |
| Sulfenamide type vulcanization accelerator (N-oxydiethylene-2-benzothiazyl sulfenamide) (MSA) | 1.7 |
| Thiuram type vulcanization accelerator (tetrabutylthiuram disulfide) (TBT) | 0.7 |

This rubber composition B is preferably used for producing a rubber vibration isolator for an automotive engine mount, because the rubber composition B is a well-balanced composition capable of giving the vulcanized rubber satisfactory heat resistance and durability. However, vulcanizing the rubber composition B for producing a rubber vibration isolator needs a comparatively long time because a comparatively large volume of rubber is needed for an engine mount and because the rubber composition B consists of comparatively low hardness materials. Thus, it has conventionally been desired to shorten the vulcanizing time of a non-bloom type rubber composition.

Invention Example B-4

A rubber composition is prepared by changing the sulfenamide type accelerators of the non-bloom type rubber composition B, from the accelerator MSA to the accelerator CZ, and adding to the composition B the accelerator B-A. In the thus prepared rubber composition, the accelerator CZ serves as the primary vulcanization accelerator, while the accelerator B-A serves as a secondary vulcanization accelerator. The secondary accelerator B-A is added in the content of 0, 0.01, 0.02, 0.1, 0.5, 1.0 or 1.5 part by weight per 100 parts by weight of the natural rubber. The vulcanization test performed in Invention Example B-3 is performed on each of the rubber composition B, and the seven rubber compositions containing the accelerator CZ in combination with the accelerator B-A in the respective contents. TABLE VI shows the test results. Similar to TABLE V, a vulcanization time is indicated by a time when voids disappear in the interior of a rubber product, namely, time of transition from symbol O to symbol X in the table.

As is apparent from the test results on TABLE VI, the vulcanizing time is significantly reduced by using the primary vulcanization accelerator CZ in combination with the secondary vulcanization accelerator B-A, as compared with that of the conventional non-blood type rubber composition B. In addition, the secondary accelerator B-A exhibits excellent vulcanization reaction-enhancing effect when it is used within the range of 0.02 to 1.0 part by weight per 100 parts by weight of the natural rubber. Furthermore, the vulcanization reaction-enhancing effect, or vulcanization rate is increased in proportion to the increased content of the accelerator B-A.

TABLE VI

| SULFENAMIDE TYPE ACCELERATORS | CZ | | | | | | | MSA |
|---|---|---|---|---|---|---|---|---|
| CONTENTS OF SECONDARY ACCELERATOR B-A (parts by weight) | 0 | 0.01 | 0.02 | 0.1 | 0.5 | 1.0 | 1.5 | 0 |
| VULCANIZING TIME | | | | | | | | |
| 9 min. | | | | | | O | X | BURNING |
| 10 min. | | | | | O | X | X | |
| 11 min. | | | | | O | X | | |
| 12 min. | O | O | O | X | | | | |
| 13 min. | O | O | X | X | | | | |
| 14 min. | X | X | X | X | | | | O |
| 15 min. | X | X | | | | | | O |
| 16 min. | X | | | | | | | X |

It is to be understood that the aforementioned inventive concepts and examples of the present invention may be changed, modified or improved by those skilled in the art, without departing from the scope and spirit of the invention defined in the appended claims.

What is claimed is:

1. A rubber composition comprising 100 parts by weight of a diene rubber material, 1.5 to 2.5 parts by weight of N-cyclohexyl-2-benzothiazyl sulfenamide, 0.02 to 1.0 part by weight of a condensation product of n-butylaldehyde and aniline, and 0.3 to 1.5 part by weight of tetrabutylthiuram disulfide.

2. The rubber composition as set forth in claim 1, wherein a vulcanization time of the rubber composition is adjustable by altering the content of said condensation product.

3. The rubber composition as set forth in claim 2, wherein said diene rubber material is selected from the group consisting of NR, BR, SBR, and any blend thereof.

4. The rubber composition as set forth in claim 2, further comprising a vulcanizing agent.

5. The rubber composition as set forth in claim 4, wherein said vulcanizing agent is sulfur.

6. The rubber composition as set forth in claim 1, further comprising at least one additive selected from the group consisting of a vulcanization accelerator, a vulcanization activator, a processing aid, an antioxidant, a reinforcing agent, and a softener.

* * * * *